United States Patent [19]

Kortschot et al.

[11] 4,005,139

[45] Jan. 25, 1977

[54] PROCESS FOR COOKED POTATO PRODUCTS

[75] Inventors: Cornelis Kortschot, Willowdale; James Joseph Miller, Toronto, both of Canada

[73] Assignee: Corporate Foods Limited, Toronto, Canada

[22] Filed: Nov. 19, 1973

[21] Appl. No.: 416,795

[30] Foreign Application Priority Data

Sept. 28, 1973 Canada ............................ 182190

[52] U.S. Cl. .......................... 426/550; 426/637; 426/441; 426/456; 426/515
[51] Int. Cl.$^2$ ........................................ A23L 1/10
[58] Field of Search .......... 426/346, 347, 371, 372, 426/438–441, 456, 464, 515–517, 550, 637, 446

[56] References Cited

UNITED STATES PATENTS

| | | | |
|---|---|---|---|
| 3,027,258 | 3/1962 | Markakis | 426/441 |
| 3,230,094 | 1/1966 | Hilton | 426/637 |
| 3,282,701 | 11/1966 | Wong | 426/347 |
| 3,282,704 | 11/1966 | Fritzberg | 426/441 |
| 3,297,450 | 1/1967 | Loska | 426/441 |
| 3,399,062 | 8/1968 | Willard | 426/347 |
| 3,451,822 | 6/1969 | Fast | 426/347 |
| 3,519,432 | 7/1970 | Sucea | 426/550 |
| 3,539,356 | 11/1970 | Benson | 426/347 |
| 3,698,914 | 10/1972 | Korbchot | 426/550 |
| 3,698,915 | 10/1972 | Glasgow | 426/550 |

*Primary Examiner*—Norman Yudkoff
*Assistant Examiner*—Martin G. Mullen
*Attorney, Agent, or Firm*—Smart and Biggar

[57] ABSTRACT

This invention relates to the continuous rehydration of dehydrated potato solids and potato mixtures to form first an homogeneous slurry which sets to a dough and the forming or shaping of this slurry or dough into products which are suitable for deep frying. The process is characterized by the improved quality of the products produced by it, and by the novel methods by which the potato solids are rehydrated and shaped or formed into pieces suitable for deep frying. The dehydrated potato solids can be either flour, flakes or granules. The dehydrated potato mixtures can be any combination of additives, binders, fillers, gums, texturizing agents and potato solids, etc., in which the potato portion constitutes at least 50% of the mixture by weight, as either flour, flakes or granules. The products can be any type of potato product, but in particular, they are deep fried potato products such as chips or French-fries.

12 Claims, No Drawings

PROCESS FOR COOKED POTATO PRODUCTS

BACKGROUND OF THE INVENTION

In prior art processes for the production of deep fried potato products, the potato doughs are generally prepared by mixing dehydrated potato solids or solid mixtures with water, using prolonged and vigorous agitation to ensure that the water is uniformly distributed throughout the mixture. Such prolonged agitation generally results in a destruction of potato cells, producing ruptured cells and free starch solids. The presence of these substances and especially that of free starch solids results in a dough which is excessively cohesive and tacky. When such doughs are used to prepare French-fried potato products, the resulting product has a gummy, only semi-mealy interior and a tough exterior skin and is consequently, inferior to an ideal French fry produced from raw potato pieces - if the doughs are used to prepare potato chips, destruction of the potato cells is less important as concerns the quality of the finished product; however, difficulty in dispersing the solids uniformly so that a lump free mixture is obtained, is encountered in either case.

In these prior art processes, the potato doughs can be prepared by either the addition of solids to water or vice versa. The types of mixing equipment used to prepare the potato dough are ribbon mixers, paddle mixers or sigma blade mixers, etc. One mixing technique which has been described, is to carry out mixing in a Hobart mixer a type of vertical, planetary action mixer manufactured by the Hobart Machine Company for only 2-3 minutes at relatively low speed to avoid destruction of the mealy character in the finished French fries.

When mixing is carried out by any of these prior art processes it is found that it is difficult to distribute water evenly throughout the mixture, since the dehydrated potato particles first contacted by the water are converted to a thickened dough and further migration of water is prevented so that dry areas are created. Moreover, in the case of French-fried products, as mixing is continued in an attempt to distribute water from areas which contain relatively too much water to areas which are dry, the potato cells are ruptured and the mealy character of the French fries produced from such doughs is partially destroyed.

These aforementioned problems are not encountered when water is combined with potato solids in an amount equal to or greater than the absorption or hydration capacity of the solids, such as in the case of mashed potato preparation. The absorption or hydration capacity of the potato solids as determined by any one of a number of standard methods (for example, AACC Method 56-20) is generally greater than 3-5 pts water/1 pt. potato solids. This amount of water is equivalent to that required for complete hydration and swelling of the potato solids to a point where free or excess water is present in the mixture and this excess water coats the potato particles of the mixture to form a continuous aqueous phase. Consequently, the apparent viscosity of such mixtures is relatively low, the potato particles are free to migrate within the continuous aqueous phase, and reconstitution of the dehydrated potato solids can be accomplished with little or no mixing.

In contrast, when a potato dough suitable for deep-fried potato products is prepared, the amount of water used is generally less than the absorption or hydration capacity of the potato solids and is of the order 1½-2½ pts. water/1 pt. potato solids. Consequently, no excess water is present in these mixtures, a continuous aqueous phase is not formed and the apparent viscosity of these mixtures is relatively high since the material forms a rigid dough upon complete absorption of all the water present by the potato particles. When mixing of these doughs is carried out, the shear stresses created are much greater than when excess water is present and the potato granules are more susceptible to breakdown under prolonged agitation.

A further disadvantage of these mixing processes is that they do not allow for the continuous production of potato dough from dehydrated potato solids. Most techniques described are batch processes, so that the dough must be transferred to an extrusion or shaping operation in a second step. In addition, if the dough is allowed to stand for long periods of time, aging processes may occur, thereby altering the texture of the products prepared from such doughs.

After the potato solids have been rehydrated, they are shaped into pieces suitable for deep-frying, by extrusion or sheeting. In a typical extrusion operation, the dough is fed to a barrel-type extruder, which consists of a screw conveyor and an orifice plate or die fitted to the end of the barrel. The screw conveyor rotates to provide the necessary pressure to convey material through the barrel and to force it through the orifice. The holes in the orifice plate can be of varying dimensions so that a wide variety of shapes is possible. For example, rectangular or cylindrical dough pieces can be produced by using square or circular shaped holes, or a continuous ribbon or sheet can be produced by using an elongated rectangular slot. Once the dough pieces are extruded, they can be cut off to the desired length using a mechanical cutter.

A disadvantage of the extrusion method is that relatively high shear forces are generated during extrusion of the dough, owing to its relatively high viscosity. Consequently, further destruction of potato cells takes place, (in addition to that caused by over-mixing), so that a product of inferior quality results.

In a typical sheeting operation, the potato dough is passed between successive pairs of rollers, which squeeze the dough into a progressively thinner sheet. For example, a first pair of rollers might be used to give a sheet of 2 inch thickness; a second pair would then reduce the 2 inch sheet to 1 inch, and a third pair would reduce the 1 inch sheet to ½ inch, etc., until the desired thickness is reached. The final sheet would then be trimmed and cut into pieces suitable for deep-frying.

The sheeting method possesses the advantage over the extrusion method, in that it does less work on the product in terms of shear. However, its disadvantages are that the doughs may have a tendency to stick to the rollers, that the edges of the sheet are invariably frayed, (especially in the case of a mealy non-cohesive French-fry dough) so that trimming and recycling are required, and that a relatively long sheeting line may be required (in comparison to the compactness of a short extruder).

Many processes employ one or the other of these operations to shape or form the potato dough, and sometimes both may be used in combination, for example, extrusion into cylindrical slabs, followed by sheeting into thin wafers, such as in the case of potato chips.

It can be seen from the preceding discussion of prior art processes, that existing rehydration and shaping methods do not provide a fully continuous method of preparing deep-fried potato products, such as French-fries and potato chips; that the mixing and shaping operations are not essentially trouble-free, and that the products produced by these methods are not completely satisfactory as regards texture and eating qualities.

BRIEF SUMMARY OF THE INVENTION

It is therefore an object of this invention to provide a continuous method for the production of deep-fried potato products, by employing a continuous mixing step followed by a continuous forming step. It is also an object of this invention to improve upon existing methods of forming or shaping deep-fried potato products and to provide for a novel method of shaping or forming these products.

What we do essentially, is to prepare an homogeneous potato solids slurry which contains a minimum amount of dry areas and a minimum amount of ruptured potato cells and free starch solids. What we have found is that this slurry rapidly sets up to form a rigid dough at a rate which is time dependent. Therefore, before this slurry has sufficient time to form a dough, we cast it into a sheet or into molds, where it is allowed to solidify into the final product form. This casting step is a technique unknown to us in the prior art for these types of potato products. Alternatively, the slurry may be fed to an extruder, where it is allowed to set and form a rigid dough just before leaving the extruder. We thereby minimize physical shear and granule rupture by working the material in its low viscosity state. This technique is also unknown to us in the prior art, and constitutes an improvement of the extrusion operation.

One advantage of our method is that the rehydration and casting/extrusion steps are continuous operations, and that the material is readily handled owing to its low viscosity and ability to flow. Another advantage is that physical shear of the product is minimized during the rehydration and shaping steps so that a product of the highest possible quality is obtained, especially when the potato slurries and doughs are used to prepare French fries.

DESCRIPTION OF THE PREFERRED EMBODIMENTS

In the embodiment of the rehydration step of our invention, it is noticed that when potato solids are combined with water under relatively slow agitation in order to prepare a dough suitable for depp-frying, complete uniform wetting of potato solids does not take place. Instead, before the solids can be completley wetted those granules which are initially wetted begin to hydrate and swell to form a rigid dough, this leaving behind those granules which are not initially wetted, to form dry areas in the mixture. It is furthermore noticed, that the process of hydration and swelling is time-dependent and that the potato solids-water mixture initally forms a slurry-like mass, which gradually thickens to form a rigid dough upon complete absorption of all the water present by the potato solids. That is to say, the viscosity of these potato solids/water mixtures is time dependent, and varies between say 10,000 cps to 1,000,000 cps or greater. This slurry-like mass is also noticed to form initially, when the ratio of water/potato solids is greater than the ratio of porosity/bulk density of the potato solids. This may be expressed mathematically as follows:

$$W/S \geq (\epsilon/B.D.) \cdot \rho$$

where
 W = pts water (g.)
 S = pts solids (g.)
 $\epsilon$ = porosity of solids, or void volume fraction
 B.D. = bulk density of solids (g./cc)
 $\rho$ = density of water (g./cc)

Or a second interpretation of the above is that the volume of water added must be equal to or greater than the void volume of the solids incorporated.

The amount of potato solids may be less than 60 percent of the solids-water mixture by weight.

The elapsed time, between the formation of the initial slurry-like state of the mixture and the final rigid dough-like state, is commonly referred to as the "open-time" of the mixture, and generally varies between 10–60 seconds, depending on the hydration rates of the potato solids used. Finally, it is noticed that this open-time can be increased by the use of chilled or cold water, because the rate of hydration of potato solids is slower at lower temperature.

It is therefore an embodiment of this invention, to prepare an homogeneous slurry, by combining potato solids and water under very rapid agitation and preferably in an enclosed chamber, before the open-time of such slurry has expired.

What we do essentially, is to feed potato solids and water to a chamber, in which these materials are instantly combined under very rapid and severe agitation for very short periods of time. The mixture is confined to the chamber only until sufficient wetting of the solids has taken place, whereupon it is continuously discharged through a suitable restriction device, such as an orifice screen or plate. The mixing action is created by one or more blades which rotate at relatively high speeds of 100 – 4000 rpm and serve to thoroughly disperse the solids in the water. The residence time of material in the chamber can be varied within the open-time of the slurry, by choosing an orifice screen, or restriction device with a suitable flow area to prevent too rapid a discharge from the chamber. The mixed material flows through the restriction device and thereby leaves the chamber as a slurry, which then forms a rigid dough externally from the mixer, once the open-time has expired. The open-time of the slurry can also be increased so that a longer residence time can be tolerated, by using cold or chilled water in the process.

Existing equipment which is capable of preparing a potato slurry in this manner, are the Fitzmill comminutor (manufactured by the Fitzpatrick co.) or the Rietz desintegrator (manufactured by the Rietz Manufacturing Co.) These units are similarly constructed and consist of a chamber within which are mounted several blades. A restriction device may be placed at the bottom of the chamber to confine material to the chamber until it is mixed. The blades can be made to rotate at very high speed and thereby effect dispersion of materials fed to the chamber.

One advantage of our rehydration method over prior art processes is that complete dispersion and wetting of potato solids is achieved with little or no damage to the potato particles. Another advantage is that the mixed material is continuously produced in the form of a slurry, which can easily be handled or transferred to a shaping operation such as extrusion or sheeting, because of its ability to flow readily.

The essential feature of our rehydration process lies in the fact that potato solids and water are instantly combined and the solids are instantly dispersed and wetted, before the solids have time to become hydrated and to swell significantly and form a dough. Consequently, the potato solids are less susceptible to destruction under the high shearing action initially employed in the process, while present in their initially "dry" unhydrated state. These features are extremely important when an homogeneous, lump-free product is to be obtained, and especially in the case of a French-fried product, where uniformity and mealiness are desired.

In the embodiment of the shaping step of our invention, the potato solids slurry can be continuously cast into various shapes, such as French fry sticks, balls, cylinders, tubes, slabs or sheets and allowed to transform into a rigid dough.

As an example of a continuous sheet casting operation, the slurry can be poured onto the surface of a moving conveyor belt, where it is confined to the belt surface by retaining walls fixed to the edges of the belt. To obtain the desired sheet thickness, a stationary blade or trowel is placed above the belt, so that the slurry passes beneath the blade edge and is smooted into its desired thickness. The positioning of the blade with respect to the point of deposition of ths slurry, will depend on the viscosity characteristics of the slurry as it travels along the belt length. For example, if the blade or trowel is placed too close to the deposition point, the slurry will have a tendency to flow once it has passed beneath the blade, and will consequently lose its imposed thickness. In contrast, if the blade is placed too far from the deposition point, where the slurry has already formed a dough, spreading it into a uniform sheet will be nearly impossible since it will have lost its ability to flow. Ideally, the blade should be placed somewhere between the two extremes. Once the sheet has been formed, it can readily be cut into pieces or strips suitable for deep-frying.

To cast the slurry into product shapes other than a sheet, the slurry can be poured into molds or dies in either a batchwise or continuous fashion. An example of a batch casting operation would be one in which the slurry is alternatively poured into individual molds or dies and allowed to solidify into a dough. The sections of the molds can then be separated, to yield individual potato shapes (e.g. French-fry sticks, balls, slabs, cylinders, tubes, etc), which are then deep-fried. An example of a continuous casting operation would be one in which the slurry is poured onto a continuously moving molded belt. The bottom half of the slurry would assume the shape of the molded surface of the belt and the top pattern could be impressed using a second molded belt or roller which would pass over the top surface of the slurry or dough.

The advantages of any of these casting methods are that virtually no shear is imposed on the product so that the optimum quality is obtained (as in the case of French-fry doughs), that an even wider variety of shapes is possible over previously known shaping techniques and that the casting operations are continuous and simple, so that operational difficulties are minimized.

In yet another variation of our shaping process, we feed a potato solids slurry rather than a potato dough, to an extruder. In an extrusion operation of the type described in the prior art, the pressure required for extrusion is dependent on the flow resistance of the material being extruded, and on the ratio of free extruder area to discharge area. For example, if a stiff dough of relatively high viscosity (e.g. 1,000,000 cps) is extruded, the pressure required is much greater than for a fluid-like slurry of relatively low viscosity (e.g. 10,000 cps), since the resistance to flow is greater in the case of the dough. Also, if the free extruder area is greater than the discharge area, relatively high extrusion pressures are required in order to compensate for the frictional pressure drop which occurs across the discharge orifice. By feeding an essentially low-viscosity potato solids slurry to the extruder, we minimize the extrusion pressure required, and hence the physical shear imposed on the product. What we do is to allow the slurry to set to a rigid dough only just before leaving the extruder. Consequently, little or no damage to the potato cells occurs, and the shaped material has the desirable characteristics suitable for producing a mealy French-fry.

When it is desired to produce a potato chip type product, our rehydration-shaping process has several advantages over existing methods. Firstly, in our hydration step, we can operate at relatively high solids content of 40–50%, or at water concentration levels given by the mathematical expression $W/S \geq \epsilon B.D. \cdot \rho$, and still obtain a fluid product which can easily be handled. Secondly, the slurries from the rehydration step can be cast into cylindrical molds and allowed to set to form a dough. The cylindrical bars formed can then be removed from the molds, and sliced into slabs or thin wafers which are suitable for deep-frying. The casting step eliminates the need for high-pressure extrusion operations normally employed for these types of products.

A final advantage of our rehydration-shaping process is its flexibility. Virtually any type of potato containing material can be used. The types of products produced from such slurries or doughs can vary from French-fried products to potato chip type products, etc. Mixing and shearing rates and residence times can be varied. The open-time of the slurries can be adjusted by controlling the residence time during mixing, or the temperature of hydration (for example, when cold water is used). The slurries can be cast or form-filled to form a wice variety of shapes. The slurries or doughs can be extruded or sheeted in order to form the desired product shapes.

The potato solids used may be flakes, flour or granules or mixtures of the potato solids and non-potato solids, in which mixture the potato solids constitute at least 50% of the mixture by weight.

Our new process allows the incorporaton of secondary food materials that would not retain their identity when processed through a conventional mixing process. After the thin slurry has been prepared but before this slurry has set to a dough, it is a very simple operation to stir in second food products such as meat, cheese, fish or vegetable. Examples include grated cheese, pre-fried bacon bits or chopped onions.

Also by preparing the slurry at two different locations along the line, it is a simple process to prepare sandwich constructions. The first slurry is cast and levelled, then a product such as bacon bits is sprinkled on followed by a second casting of slurry.

EXAMPLE 1: Rehydration of Potato Solids

A uniform dry mix was made by blending 65% potato solids as granules, with various fillers and additives in a ribbon mixer for about 15 minutes.

Potato Granules 65%
Other 35%

This dry mix was then fed to the top of the chamber of a Fitzpatrick comminutor (Model No. DA506) at a rate of approximately 11 lb/minute using a screw conveyor feeder.. Water at a temperature of 20° C was also fed to the side of the chamber at about 22lb/minute; using a metering pump. The ratio of water to solids employed for the test was therefore approximately 2 pts. water/1 pt. solids. The blade speed was set for approximately 1700 rpm and a ¾ orifice screen was fitted to the bottom of the chamber to control the discharge rate.

Results:

The material emerged continuously from the discharge end of the comminutor as a solids/water slurry. At the end of approximately 15-20 seconds, this slurry changed from a low viscosity mixture to a high viscosity mixture and formed a rigid dough.

Examination of the dough revealed that it was short and uncohesive in texture, without the presence of large dry areas. The dough seemed similar in texture to that which would be obtained by mixing such solids and water in a Hobart mixer at low agitation for a short period of time, except that no large dry areas were noticed.

What I claim is my invention:

1. A continuous method for the production of cooked potato products which comprises the steps of:
   a. rapidly mixing dehydrated potato solids with water in an amount sufficient to hydrate the potato solids and to form a stiff dough suitable for frying, said mixing being sufficiently rapid and severe to form a homogeneous, pourable, low viscosity slurry of said potato solids and water before formation of said stiff dough;
   b. pouring said slurry onto a surface to form said slurry into a desired shape while it is still pourable and before formation of said stiff dough;
   c. permitting the shaped slurry to transform by hydration into a stiff dough suitable for frying; and
   d. cooking said stiff dough.

2. A method according to claim 1 wherein the cooking step comprises frying said stiff dough.

3. A method according to claim 1 wherein the slurry is formed into desired shape by pouring a sheet of said slurry on said surface.

4. A method according to claim 1 wherein the slurry is formed into desired shape by pouring the slurry into a mold.

5. A method according to claim 1 wherein the water used to form said slurry is chilled to retard the hydration of said potato solids.

6. A method according to claim 1 wherein the ratio of water/potato potato solids is greater than the ratio of solids porosity/solids bulk density.

7. A method according to claim 1 wherein the potato solids constitute less than 60% by weight of the slurry.

8. A method according to claim 7 wherein the potato solids constitute from 40–50% by weight of the slurry.

9. A method according to claim 1 wherein the water is present in said slurry in an amount of about 1.5 to 2.5 parts by weight per part by weight of potato solids.

10. A method according to claim 1 wherein a second food material is incorporated into said slurry.

11. A method according to claim 1 wherein the potato solids used are flakes, flours granules, or mixtures of said potato solids.

12. A method according to claim 11 wherein said potato solids are in admixture with non-potato solids.

* * * * *